US007571091B2

(12) United States Patent
Colley

(10) Patent No.: US 7,571,091 B2
(45) Date of Patent: Aug. 4, 2009

(54) EXTENSIBLE CONSOLE EMULATOR

(75) Inventor: Mark A. Colley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 11/533,976

(22) Filed: Sep. 21, 2006

(65) Prior Publication Data

US 2008/0077683 A1 Mar. 27, 2008

(51) Int. Cl.
*G06F 9/455* (2006.01)
*G06F 9/44* (2006.01)
*G06F 9/45* (2006.01)

(52) U.S. Cl. .............................. 703/27; 703/24; 703/26; 717/103; 717/134; 717/138; 717/148; 707/4

(58) Field of Classification Search ............. 703/22–27; 717/100–103, 120, 127, 131, 134, 136, 138, 717/148, 176; 707/3–5; 709/223
See application file for complete search history.

(56) References Cited

U.S. PATENT DOCUMENTS 7,191,438 B2 * 3/2007 Bryant ....................... 717/176
7,478,390 B2 * 1/2009 Brokenshire et al. ........ 718/100
7,496,917 B2 * 2/2009 Brokenshire et al. ........ 718/100

OTHER PUBLICATIONS

Ning et al., A. On a Responsive Replenishment Systems: A Fuzzy Logic Approach, IEEE, IEEE International Conference on Industrial Information, Aug. 2006, pp. 457-462.*
Maassen et al., J. Efficient Java RMI for Parallel Programming, ACM, Transactions on Programming Languages and Systems, Nov. 2001, pp. 1-29.*

* cited by examiner

*Primary Examiner*—Russell Frejd
(74) *Attorney, Agent, or Firm*—William Schiesser; Hoffman Warnick LLC

(57) ABSTRACT

The present invention is directed to an extensible console emulator for Hyperion Performance Suite interaction. An emulator system in accordance with an embodiment of the present invention includes: a Hyperion Performance Suite (HPS) console emulator for receiving commands from a source and for performing actions based on the commands; and an HPS Software Development Kit (SDK) for receiving output from the HPS console emulator and for interacting with the HPS; wherein the HPS console emulator provides an interface that allows a user to interact with the HPS via the HPS SDK.

12 Claims, 3 Drawing Sheets

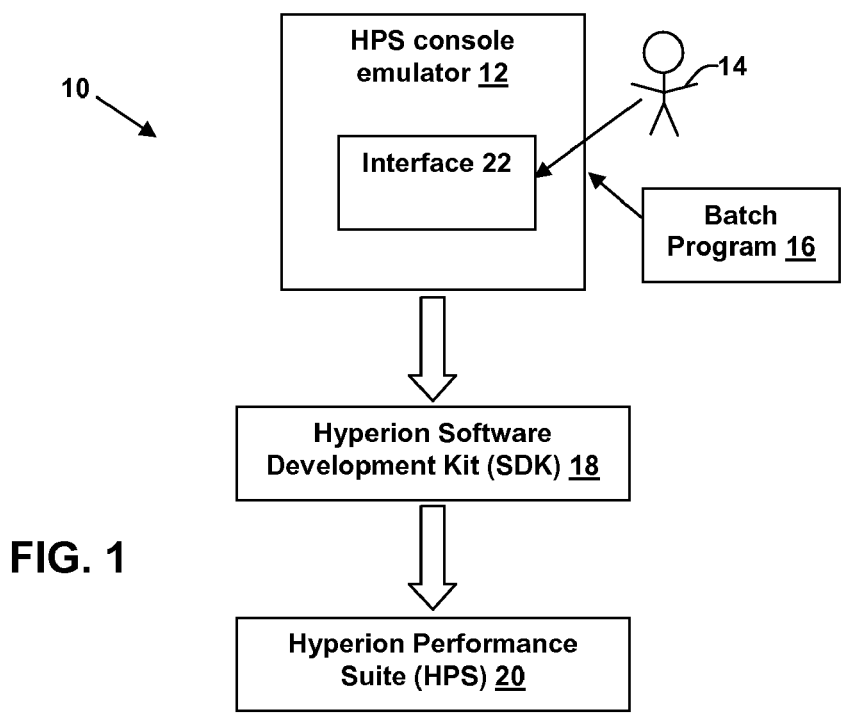

FIG. 1

```
lst         Lists scheduled tasks in the HPS                              I-1
lu          Lists users in an HPS Group
mb          Modify browsability of HPS items
meh         Modifies the HPS event on-hold property
mkdir       Create a new folder in the HPS
mkw         Modifies Keywords of HPS Content
more        Displays piped input 30 lines at a time
mp          Command for modifying permissions on HPS objects
mr          Modifies the roles of HPS Users or Groups
mv          Moves HPS content from one location to another
open        Opens a document from the HPS
printenv    Prints Environment Variables and their values
pwd         Prints the current directory
rename      Renames HPS content
rm          Remove items from the HPS
rmdir       Remove a folder from the HPS
rmo         Removes Job Outputs from the HPS
search      Searches the HPS based on Keywords
setenv      Creates or Sets Environment Variables
su          Allows changing the active user
svcinf      Allows for retrieval of information regarding system services
te          Triggers an Event
who         Lists HPS Users currently logged in
whoami      Prints the active User's userid To show more-detailed help for a specific command:
help <cmd>
Other tips:
<cmd1> | <cmd2> Pipe output from one command into another
<cmd> >> <filename> Redirect output into a file
${<envvar>} Reference an environment variable
```

FIG. 2

1 - CDT administrator                                                                       I-2

[diwu_bcs&ods_test_1 Wed Jan 18 13:53:51 GMT 2006]
  [diwu_bcs&ods_test_2]
  [diwu_bcs&ods_test_3]
  *[GARS Broker Status]
  [HRIW Audit Access Report Test CDT.bqy]
  *[Job-175153]
  *[Job-176122_wudi]
  *[Job-46679]
  *[Job-46679GARS GRT Feature Receipts]
  *[Job-59]
  *[Job-75637]
  *[Job-83266]
  [Odm_projc_rpt6_sit_2005_0908_0302]
  *[OM Strategic - Agency Activity A0B-AN0B Report--Alvin]
  *[OM Strategic - Hires by Source]
  [OM_Strategic_-_Business_Unit_Report_STG00]
  [OM_Strategic_-_BU_Report_BU_BCS00)
  *[RI9-funct_skills_assessment]
  [RES0 C0InS Chemical Usage]
  [SAPCFI WW CRH Printers Current_Qtr]
  [SAPCFI WW CRH Storage Current_Qtr]
  [SAPCFI WW CPU XSeries Current Qtr]
  *[SPIDER 0MIW AP - Preprcessed - Current Qtr]
  [Tutorial4.bqy]
  [Virtual view profile report_05262006]
[administrator] /Testing Folder > pwd
  /Testing Folder
[administrator] /Testing Folder >

FIG. 3

3 - CDT smith                                                                              I-2 lst           Lists scheduled tasks in the HPS
  lu            Lists users in an HPS Group
  mb            Modify browsability of HPS items
  meh           Modifies the HPS event on-hold property
  mkdir         Create a new folder in the HPS
  mkw           Modifies Keywords of HPS Content
  more          Displays piped input 30 lines at a time
  mp            Command for modifying permissions on HPS objects
  mr            Modifies the roles of HPS Users or Groups
  mv            Moves HPS content from one location to another
  open          Opens a document from the HPS
  printenv      Prints Environment Variables and their values
  pwd           Prints the current directory
  rename        Renames HPS content
  rm            Remove items from the HPS
  rmdir         Remove a folder from the HPS
  rmo           Removes Job Outputs from the HPS
  search        Searches the HPS based on Keywords
  setenv        Creates or Sets Environment Variables
  su            Allows changing the active user
  svcinf        Allows for retrieval of information regarding system services
  te            Triggers an Event
  who           Lists HPS Users currently logged in
  whoami        Prints the active User's userid To show more-detailed help for a specific command:
  help <cmd>
  Other tips:
  <cmd1> | <cmd2> Pipe output from one command into another
  <cmd> >> <filename> Redirect output into a file
  ${<envvar>} Reference an environment variable

FIG. 4

HPS Console Emulator Service

File　Edit　View　Go　Bookmarks　Tools　Help

I-3

[diwu_bcs&ods_test_1 Wed Jan 18 13:53:51 GMT 2006]
[diwu_bcs&ods_test_2]
[diwu_bcs&ods_test_3]
*[GARS Broker Status]
[HRIW Audit Access Report Test CDT.bqy]
*[Job-175153]
*[Job-176122_wudi]
*[Job-46679]
*[Job-46679GARS GRT Feature Receipts]
*[Job-59]
*[Job-75637]
*[Job-83266]
[0dm_projc_rpt6_sit_2005_0908_0302]
*[0M Strategic - Agency Activity A0B-AN0B Report--Alvin]
*[0M Strategic - Hires by Source]
[0M_Strategic_-_Business_Unit_Report_STG00]
[0M_Strategic_-_BU_Report_BU_BCS00)
*[RI9-funct_skills_assessment]
[RES0 C0InS Chemical Usage]
[SAPCFI WW CRH Printers Current_Qtr]
[SAPCFI WW CRH Storage Current_Qtr]
[SAPCFI WW CPU XSeries Current Qtr]
*[SPIDER 0MIW AP - Preprcessed - Current Qtr]
[Tutorial4.bqy]
[Virtual view profile report_05262006]
[administrator] /Testing Folder > pwd
 /Testing Folder
[administrator] /Testing Folder >

FIG. 5

EXTENSIBLE CONSOLE EMULATOR

BACKGROUND OF THE INVENTION

1. Field of the Invention

The present invention generally relates to an emulator. More specifically, the present invention is directed to an extensible console emulator for Hyperion Performance Suite interaction.

2. Related Art

The Hyperion Performance Suite (HPS) is a report and document distribution platform ("Hyperion" and Hyperion product names are trademarks of Hyperion in the United States, other countries, or both). More specifically, HPS is enterprise-class query, analysis, and reporting software, based on a scalable foundation for information delivery. It allows users to access, analyze, and distribute information from disparate sources, and to view that data in personalized dashboards.

Administration and use of the HPS is typically performed via a Web browser, although some administrative tasks require server-side Java applications, and some other tasks are possible via scripting and file editing (Java and all Java-based trademarks are trademarks of Sun Microsystems, Inc. in the United States, other countries, or both). Many day-to-day administrative tasks can only be performed via the Web browser interface, some of which can require many clicks and page-loads. This can be time-consuming for menial tasks on either side, but especially for the administrator of an HPS. It is difficult to export system configuration, status, and content information to an accessible format outside this web-based interaction.

Hyperion does, however, provide a Software Development Kit (SDK), written in Java, that can be used to automate some administrative tasks or system interactions. Not all of the HPS functionality is exposed via the SDK, but a large number of interactions are possible.

To take advantage of the SDK, one must develop a Java application that wraps these SDK objects and methods into some usable form. This is typically done on a case-by-case basis, perhaps creating reusable utility objects to wrap SDK functionality, or creating custom objects for very specific HPS interactions. This can be problematic. For instance, while it is possible to start from a similar set of base functionality, the user-interface could be implemented in differing fashions, solutions that might otherwise be reusable might be locked within larger applications, and any base functionality may not be reusable depending on the overall requirements driving the SDK application design.

There is a need, therefore, for an extensible interface that allows for a standard way to wrap HPS SDK code into useful, reusable components that can be interacted with by a user or in batch-mode fashion and for outputting information to a file.

SUMMARY OF THE INVENTION

The present invention is directed to an extensible console emulator for Hyperion Performance Suite interaction.

A first aspect of the present invention is directed to an emulator system, comprising: a Hyperion Performance Suite (HPS) console emulator for receiving commands from a source and for performing actions based on the commands; and an HPS Software Development Kit (SDK) for receiving output from the HPS console emulator and for interacting with the HPS; wherein the HPS console emulator provides an interface that allows a user to interact with the HPS via the HPS SDK.

A second aspect of the present invention is directed to an emulation method, comprising: providing a Hyperion Performance Suite (HPS) console emulator for receiving commands from a source and for performing actions based on the commands; and receiving, by an HPS Software Development Kit (SDK), output from the HPS console emulator, wherein the HPS SDK interacts with the HPS; wherein the HPS console emulator provides an interface that allows a user to interact with the HPS via the HPS SDK.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

FIG. 1 depicts a system including an extensible console emulator for Hyperion Performance Suite (HPS) interaction in accordance with an embodiment of the present invention.

FIGS. 2-5 depict illustrative screenshots of various interfaces in accordance with embodiments of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The present invention provides an extensible console emulator for Hyperion Performance Suite (HPS) interaction. The emulator, hereafter referred to as an HPS console emulator, defines a user interface that allows a user (e.g., an administrator) to interact with the HPS via Software Development Kit (SDK) methods and objects by simply typing short commands into a console application that then performs the appropriate actions based on the received command. Typing 1 or 2 commands is much easier than browsing and clicking through 5-10 pages, especially for an administrator that knows the path and the end goal but still has to wait for page loads to accomplish that goal.

The HPS console emulator provides a way to direct command output to a file, allowing an administrator to get useful information out of the HPS in ways that the Web interface does not provide, and in ways that would otherwise require custom SDK code to be written.

The HPS console emulator also provides a way to push commands through the emulator in batch mode by providing a file containing a list of commands. Frequent HPS administrative tasks can thus be entirely automated. These automated steps can then be easily modified by adjusting the list of commands in the command file itself, requiring no recompiling.

Certain core commands are standard, but additional commands can be created by writing and compiling a Java class that implements the command interface or extends a previous implementation. New or updated commands can be made available to interested parties at regular intervals. The HPS console emulator can load any referenced command classes at runtime, thereby making all commands (commands the user's HPS console emulator installation may have never encountered before) available via the same, familiar command-line interaction. Different implementations of the HPS console emulator's interface can provide different features and functionality to surround this same command-line interface, increasing utility to the user, but again doing so without recompilation of the HPS console emulator itself.

As depicted in the system 10 illustrated in FIG. 1, the HPS console emulator 12 represents a layer between a user 14 (or a batch program 16) and the Hyperion SDK 18. The Hyperion SDK 18 interacts with the Hyperion Performance Suite (HPS) 20 in a proprietary fashion. The additional layer embodied by the HPS console emulator 12 provides a framework through which both the user 14 and a SDK developer can reap tremendous benefits in efficiencies and usability. The user 14 (e.g., an HPS administrator) can type commands into the HPS console emulator 12 and receive a response to a screen or to a file, run a list of commands in batch mode, or schedule a list of commands to be run in batch. An SDK developer can use the framework to surround useful SDK code with a simple interface that can be run interactively or in batch. To this extent, the developer is freed from much of the development overhead involved with establishing an SDK program, and is allowed to concentrate on the capability of the command they are attempting to implement. The result is a familiar, easy-to-use interface that allows users to get more out of their HPS and higher return on investment (ROI) for their SDK development efforts.

Interactive Mode

In interactive mode, the user 14 starts the HPS console emulator 12 by triggering a Java application using an implementation of the HPS console emulator's interface 22 (the interface), or an application that wraps an implementation of the interface 22. The interface 22 instantiates an instance of the primary engine of the HPS console emulator 12, the "HPSConsoleEmulator" class, and starts it. The HPS console emulator 12 establishes a session with the HPS 20, using the Hyperion SDK 18, and login parameters specified in either a properties file or provided via the implementation of the interface 22. Upon establishing a session, the HPS console emulator 12 loads all command classes into the Java Virtual Machine (JVM) using reflection. The list of commands that are loaded is based on the contents of a text file that can be modified to add or remove command availability in the HPS console emulator 12. Each class listed must be an implementation of the HPSConsoleCommand interface (or an extension of a previous implementation). As these commands are loaded, they are registered with the HPSConsoleCommandDispatcher, which is used by the HPS console emulator 12 to direct a given command to the appropriate implementation of the HPSConsoleCommand interface based on the command line it receives (which was originally typed by the user). The HPS console emulator 12 passes a prompt to the interface 22 that instantiated it, and the interface 22 prints the prompt to the screen and awaits user 14 input (e.g., via a keyboard). At this point, all prompts the user 14 receives are from the HPS console emulator 12, not from the operating system of the system in which the user 14 is working. The user 14 types a command into the interface 22, and actuates the [Enter] key. The text the user 14 entered is passed to the HPS console emulator 12, which evaluates the text string for the presence of a few known command strings that will be handled by the HPS console emulator 12, rather than forwarded to the dispatcher. If the command must be forwarded to the dispatcher, this is done. The dispatcher parses the received string to determine the brief 'cmd' string it contains and attempts to forward this string to the command object that has been registered in association with the matching 'cmd' string. Upon receiving the complete command string that the user 14 entered, the command object receiving the dispatcher's call reacts appropriately, interacting with the HPS 20 via the SDK 18, and providing appropriate feedback to the user 14. Upon completion of the Command Object's task, the HPS console emulator 12 once again passes a prompt to the interface 22 that instantiated it, and the interface 22 prints the prompt to the screen and awaits the next command from the user 14. Similar to the HPS console emulator 12 handling the 'exit' and 'cmdfile' commands, the dispatcher handles several special 'cmd' strings as well. These include, for example, 'help' and 'clear'. This allows the dispatcher to list all registered commands and a brief description whenever receiving 'help', or command-specific extended help upon receiving 'help <cmd>'. The basic user-interaction with commands has been enhanced by allowing command output to be piped into other commands before being printed to the screen. Output can also be redirected to a file rather than to the screen. Commands can also be listed in a script file and processed in batch mode using the 'cmdfile' command handed by the HPS console emulator 12 itself.

Batch Mode

Startup is the same as in interactive mode, but since the application is triggered with additional arguments, the HPS console emulator 12 will be set to run in batch mode. The path to a command file is a required argument, with the command file containing a list of HPS console emulator 12 command strings that will be processed in order, without interaction from the user. This allows for full automation of any non-interactive HPS console emulator commands, and the redirection of the output from these commands to a file that can then be processed further or emailed to administrators at a regular interval.

Illustrative screenshots from different interfaces 22 that each interact with the HPS console emulator 12 of the present invention are illustrated in FIGS. 2-5. It should be noted that the core Java code does not change in these various instances, only the interface 22 itself. This allows any number of interfaces 22 to be imagined and built without having to rebuild the core. Additionally, these various interfaces 22 do not eliminate the extensible nature of the HPS console emulator 12, whereby one can control which commands are made available in any deployment. One can still add new commands that one may have developed (extend), or use new versions of existing commands instead (override). The illustrative screenshots are from the following versions of the interface 22:

I-1—Default—Running in AIX (FIG. 2);

I-2—Multi-tabbed Java Swing—Running in Windows XP (FIGS. 3-4) (Windows is a trademark of Microsoft Corporation in the United States, other countries, or both); and I-3—Web-based—Running inside a J2EE Web Application fronted by a Web page running in Firefox (FIG. 5) (Firefox is a trademark of Mozilla in the United States, other countries, or both).

The multi-tabbed Java Swing interface 22 depicted in FIGS. 3 and 4 allows a user to connect one or more times to one or more HPS environments and maintain a plurality of completely separate sessions at one time. Users can move back and forth between sessions at will, save their configured sessions for later use or for use at startup, etc.

The present invention or portions thereof can be implemented on any now known or later developed computer system that is capable of executing computer program code. The computer program code can be provided on a computer-readable medium or provided in any other suitable manner.

The foregoing description of the embodiments of this invention has been presented for purposes of illustration and description. It is not intended to be exhaustive or to limit the invention to the precise form disclosed, and many modifications and variations are possible.

What is claimed is:

1. An emulator system, comprising:
    a Hyperion Performance Suite (HPS) console emulator for receiving commands from a source and for performing actions based on the commands; and
    an HPS Software Development Kit (SDK) for receiving output from the HPS console emulator and for interacting with the HPS;
    wherein the HPS console emulator provides an interface that allows a user to interact with the HPS via the HPS SDK.

2. The emulator system of claim 1, wherein the source comprises a user or a batch file.

3. The emulator system of claim 1, wherein the HPS console emulator can be operated in an interactive mode or a batch mode.

4. The emulator system of claim 1, wherein the HPS console emulator is configured to allow a user to interact with the HPS via the HPS SDK using a plurality of different interfaces.

5. The emulator system of claim 1, further comprising:
    a system for directing command output to a file or a display screen.

6. The emulator system of claim 1, wherein the HPS console emulator is extensible.

7. An emulation method, comprising:
    executing on a computer system a Hyperion Performance Suite (HPS) console emulator for receiving commands from a source and for performing actions based on the commands; and
    receiving, by an HPS Software Development Kit (SDK), output from the HPS console emulator, wherein the HPS SDK is executed on a computer system and interacts with the HPS;
    wherein the HPS console emulator provides an interface that allows a user to interact with the HPS via the HPS SDK.

8. The emulation method of claim 7, wherein the source comprises a user or a batch file.

9. The emulation method of claim 7, further comprising:
    operating the HPS console emulator in an interactive mode or a batch mode.

10. The emulation method of claim 7, wherein the HPS console emulator is configured to allow a user to interact with the HPS via the HPS SDK using a plurality of different interfaces.

11. The emulation method of claim 7, further comprising:
    directing command output to a file or a display screen.

12. The emulation method of claim 7, wherein the HPS console emulator is extensible.

* * * * *